(12) United States Patent
Bray et al.

(10) Patent No.: US 6,542,233 B1
(45) Date of Patent: Apr. 1, 2003

(54) METHOD AND APPARATUS FOR THE MEASUREMENT OF ERBIUM OPTICAL AMPLIFIERS

(75) Inventors: Mark E Bray, Paignton (GB); Ross T Elliott, Paignton (GB); Kevan P Jones, Totnes (GB); Robert W Keys, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 226 days.

(21) Appl. No.: 09/679,164

(22) Filed: Oct. 4, 2000

(51) Int. Cl.[7] ................................................. H01S 3/00
(52) U.S. Cl. ...................... 356/324; 359/337; 359/341; 359/124; 250/225
(58) Field of Search ........................ 356/324; 359/337, 359/341, 124; 250/225

(56) References Cited

U.S. PATENT DOCUMENTS 5,223,705 A * 6/1993 Aspell et al. ................ 250/225
6,356,385 B1 * 3/2002 Digonnet et al. ............ 359/337
6,407,854 B1 * 6/2002 Shum ..................... 359/337.11

OTHER PUBLICATIONS

P F Wysocki, "Broadband amplifier measurement techniques" Optical Amplifiers and their Applications, Quebec, Canada, Jul. 9–12, 2000.

The noise gain profile technique explained in "The 1996 Lightwave Transmission Seminar & Exhibition", W Benger, and J Vobis, Hewlett–Packard, pp64–65, 1996.

M E Bray, R T Elliott and K P Jones, Comparison of erbium amplifier characterisation using an ITU grid with varying channel separations.

"High Power Broadband ASE Source Method Amplifiers", Mark Bray.

* cited by examiner

Primary Examiner—Bruce Anderson
Assistant Examiner—Zia R. Hashmi
(74) Attorney, Agent, or Firm—Barnes & Thornburg

(57) ABSTRACT

An inexpensive broadband source such as an ASE source, used for erbium amplifier measurements, compares well with the use of a prior art ITU grid. Deltas are less than 0.4 and 0.3 dB for gain and noise figure respectively. The spectral loading used to test erbium amplifiers needs to closely resemble conditions seen in the field. Use of an ITU grid is a good way of achieving this, however it is a costly solution and may restrict the spectral resolution. Use of a high power amplified spontaneous emission source gives a cost-effective alternative, which compares well with ITU grid measurements. In addition the spectral resolution of the measurement is then only limited by the spectral resolution of the optical spectrum analyzer.

12 Claims, 4 Drawing Sheets

METHOD AND APPARATUS FOR THE MEASUREMENT OF ERBIUM OPTICAL AMPLIFIERS

FIELD OF THE INVENTION

This invention relates to methods and apparatus for testing erbium optical amplifiers.

BACKGROUND OF THE INVENTION

Recent developments in erbium amplifier technology, particularly driven by the expansion of the wave division multiplexed (WDM) bandwidth over which gain is required, have highlighted issues with historic amplifier measurement methods. As amplifier designs have moved from "red band" (~1540–1560 nm) to "full band" (~1530–1565 nm) and eventually "extended band" (~1570–1606 nm) non-linear physical phenomena have become increasingly important. Perhaps the most important of these in this context is spectral hole burning. In this phenomenon, the presence of a strong input signal "burns" a hole in the gain spectrum near to the wavelength of the input signal. This not only distorts the gain spectral shape, but also alters the operating condition, thereby inducing dynamic gain tilt into the spectrum. Such spectral hole burning is only significant if much of the input signal is concentrated in a small portion of the spectrum. This occurs, for example, in measurements using the 'noise gain profile' technique, in which the amplifier is placed in its saturated condition using a single saturating wavelength. This measurement techniques is therefore particularly prone to errors caused by spectral hole burning.

FIG. 1 shows a comparison of measurements made using the prior art noise gain profile technique and demonstrates spectral hole burning with an ideal spectrum. In this case, non-ideal extinction of the saturating signal leads to noisy peaks at the saturating signal's wavelengths (1530 nm and 1550 nm respectively).

It will be appreciated that for accurate measurements, the test source used must accurately represent the multi-channel loading which the amplifier will experience within the real world system for which the amplifier is designed.

The channel wavelengths and spacings used in a WDM network have been standardised by the International Telecommunications Union (ITU) which has defined a so-called "ITU Grid" which presently specifies channels spaced 100 GHz apart typically in the 1611.79 nm to 1492.2 nm wavelength range (186.00 THz–200.90 THz) spreading from a reference wavelength of 1552.52 nm (193.1 THz).

One approach to the measurement of an erbium amplifier for such use is comparative measurement using a grid of signals selected from the ITU grid with varying channel separations. Populating the grid completely with wavelength stabilised channels separated by 100 GHz or less is expensive. Using a sub-populated grid can give a reasonable accuracy but reduces the spectral resolution available. Thus in the prior art, there is a trade-off between accuracy/resolution and cost.

SUMMARY OF THE INVENTION

The spectral loading used to test erbium amplifiers needs to closely resemble conditions seen in the field. Use of an ITU grid is a good way of achieving this, however it is a costly solution and may restrict the spectral resolution. Use of a broadband source such as a high power amplified spontaneous emission source gives a cost-effective alternative, which compares well with ITU grid measurements. In addition the spectral resolution of the measurement is then only limited by the spectral resolution of the optical spectrum analyser.

Thus, in a first aspect, the invention provides a method of testing an optical amplifier comprising the steps of coupling an ASE source to the amplifier input, and measuring the amplifier performance using an optical spectrum analyzer.

In a second aspect, the invention provides apparatus for testing an optical amplifier comprising a first terminal couplable to the input terminal of an amplifier under test, an ASE source having its output coupled to the first terminal, a second terminal couplable to the output of an amplifier under test, and a third terminal coupled to the second terminal and couplable to an optical spectrum analyzer.

The term 'optical spectrum analyzer' as used herein encompasses a measuring instrument operable to analyze optical characteristics in a relatively narrow frequency band which does not necessarily cover the whole of the operating spectrum of the device under test.

BRIEF DESCRIPTION OF THE DRAWINGS

Embodiments of the invention will be now be described by way of example with reference to the drawings in which.

DETAILED DESCRIPTION OF THE PREFERRED EMBODIMENTS

Figure 1:
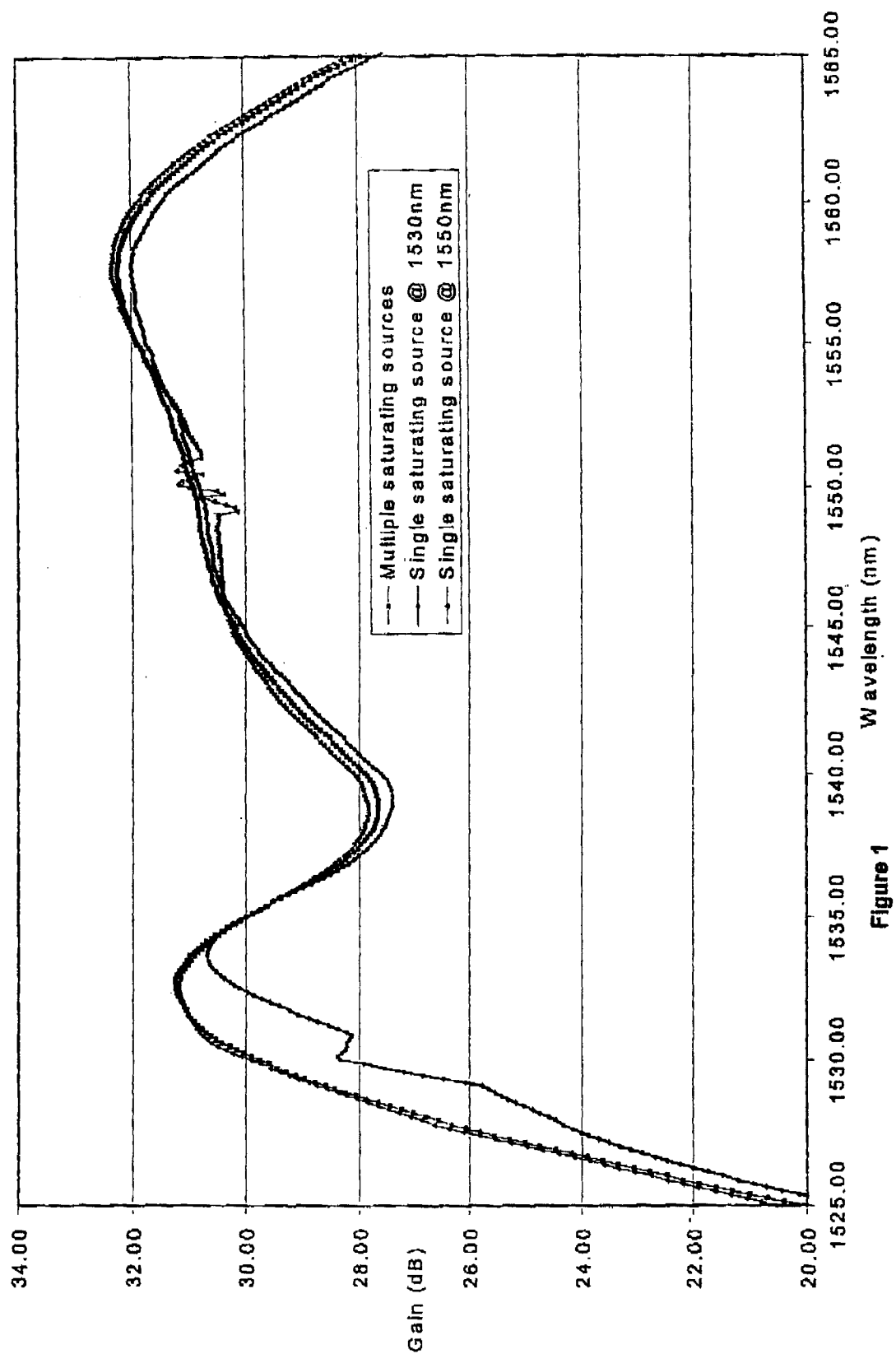
FIG. 1 is a plot showing the measurement of spectral hole burning.
Figure 2:
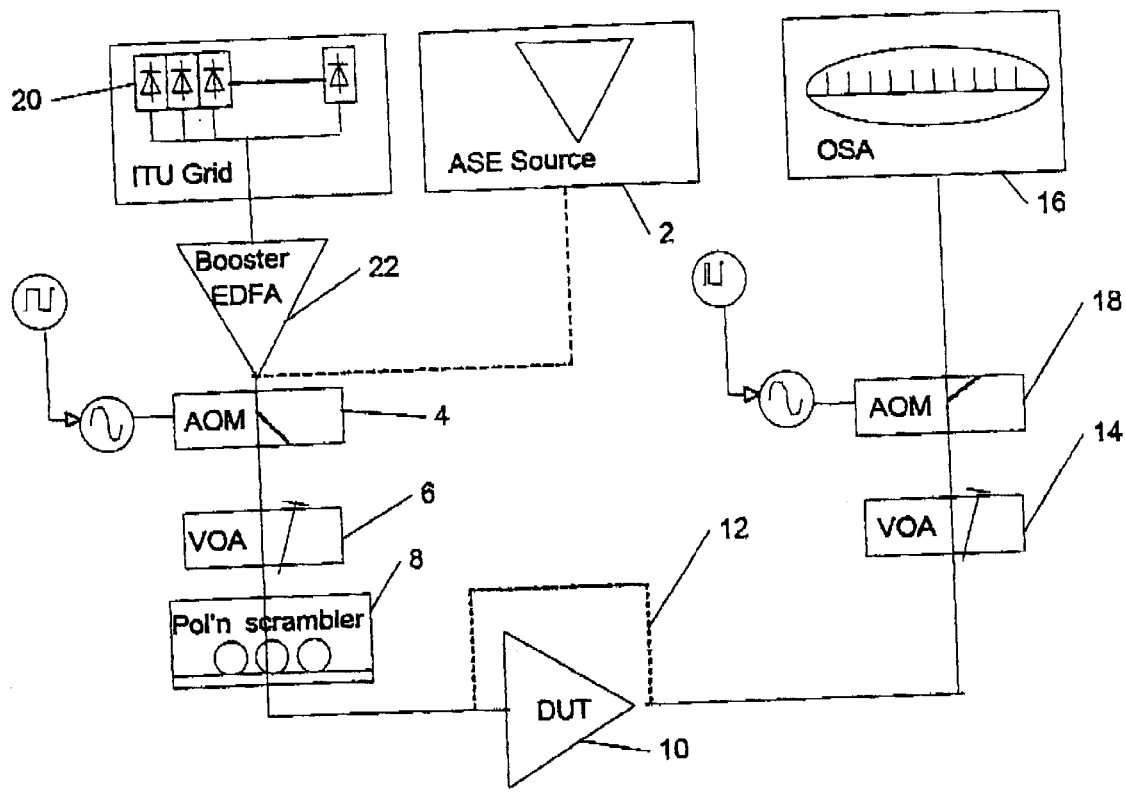
FIG. 2 is a schematic block diagram of apparatus in accordance with the invention.

The preferred embodiment of the test equipment is shown schematically in FIG. 2.

A high power flattened amplified spontaneous emission source (ASE) 2 has its output fed into an acousto-optic modulator 4 which as described below, operates typically with a 50% duty cycle. After passing through a variable optical attenuator 6 which controls the input power to the device under test the polarisation of the signals may if desired, be randomised by a polarisation scrambler 8.

The signals then pass through the device under test 10 (or bypass it 12 for back to back measurements), and then through a variable attenuator 14 to condition the power into the optical spectrum analyser 16. Another acousto-optic modulator 18 with a 25% duty cycle then gates the signals before measurement on the optical spectrum analyser 16.

Figure 3:
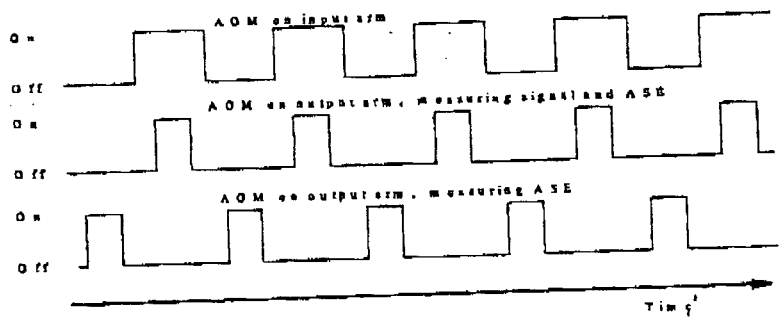
FIG. 3 is a timing diagram of the acousto-optic modulators of FIG. 2.

By varying the phase of the second modulator 18 with respect to the first modulator 4, the optical spectrum analyser 16 can be used to measure signal or device ASE traces. The timing diagram for the acousto-optic modulators is shown in FIG. 3.

Figure 4:
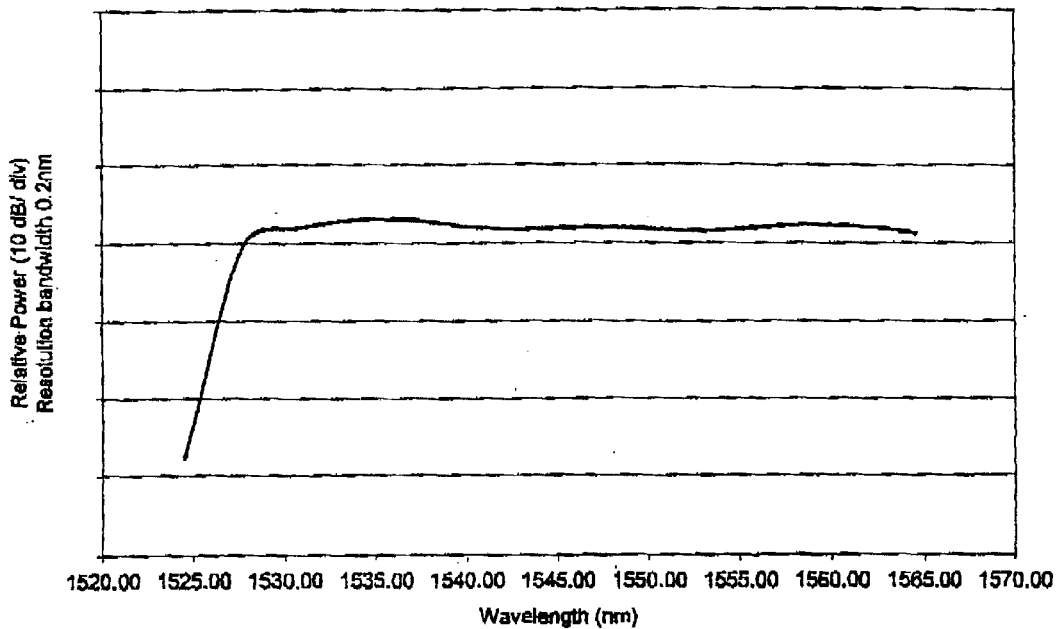
FIG. 4 is a plot of a typical ASE source spectrum.

The spectrum delivered by a typical ASE source is shown in FIG. 4. The source was capable of delivering more than 24 dBm of power with a ripple over the required spectrum of less than 1.6 dB.

Thus in the preferred embodiment, the measurement method used is a time domain extinction technique. In this method, the sources are on-off modulated (using the modulator 4) upstream of the device under test at a sufficient frequency that the amplifier saturation does not significantly alter during the off phase. Measurements on the optical spectrum analyser are gated (using the second modulator 18) so that they occur when the sources are on (measuring signals and device ASE noise) and also when they are off (measuring device ASE noise only). Back to back signal measurements are also made to characterise the input to the amplifier.

Measurements made using an ASE source may be compared with those using an ITU grid. In this case, the ASE source may be substituted with ITU sources 20 which are coupled together and fed into a boost erbium-doped fibre amplifier (EDFA) 22. This increases the input power to the device under test. As described above, if an ASE source is used its output is coupled directly to the point following the boost amplifier. The boosted signals are modulated by an acousto-optic modulator.

Figure 5:
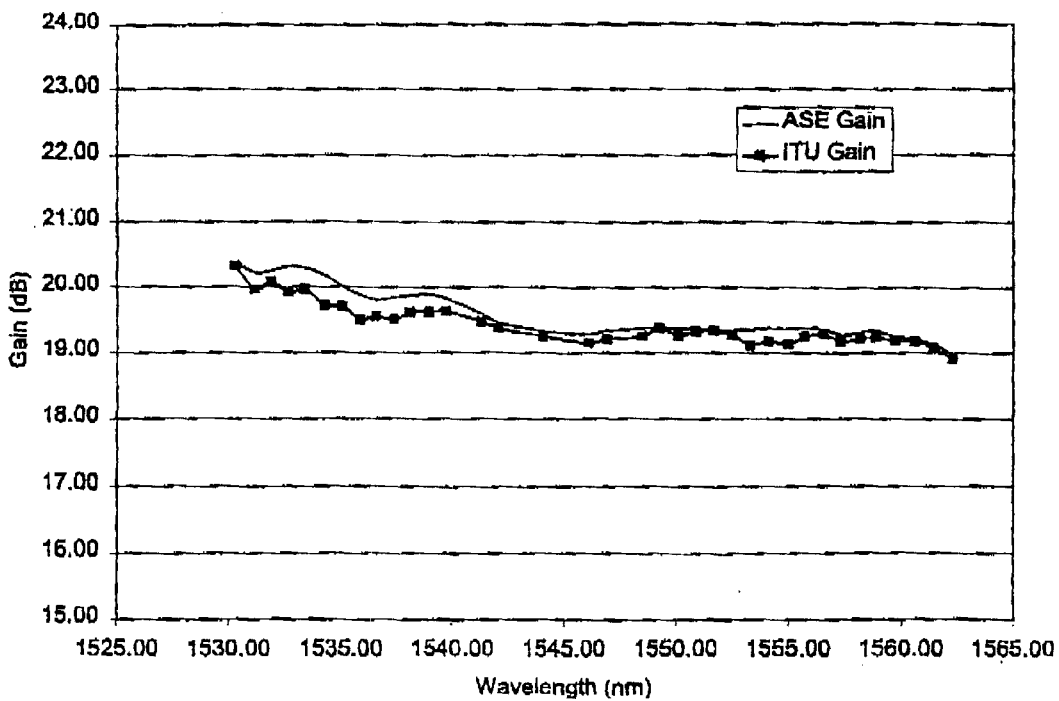
FIG. 5 is a plot comparing a gain spectrum obtained using the apparatus of FIG. 2 with the spectrum obtained using a conventional ITU grid source.
Figure 6:
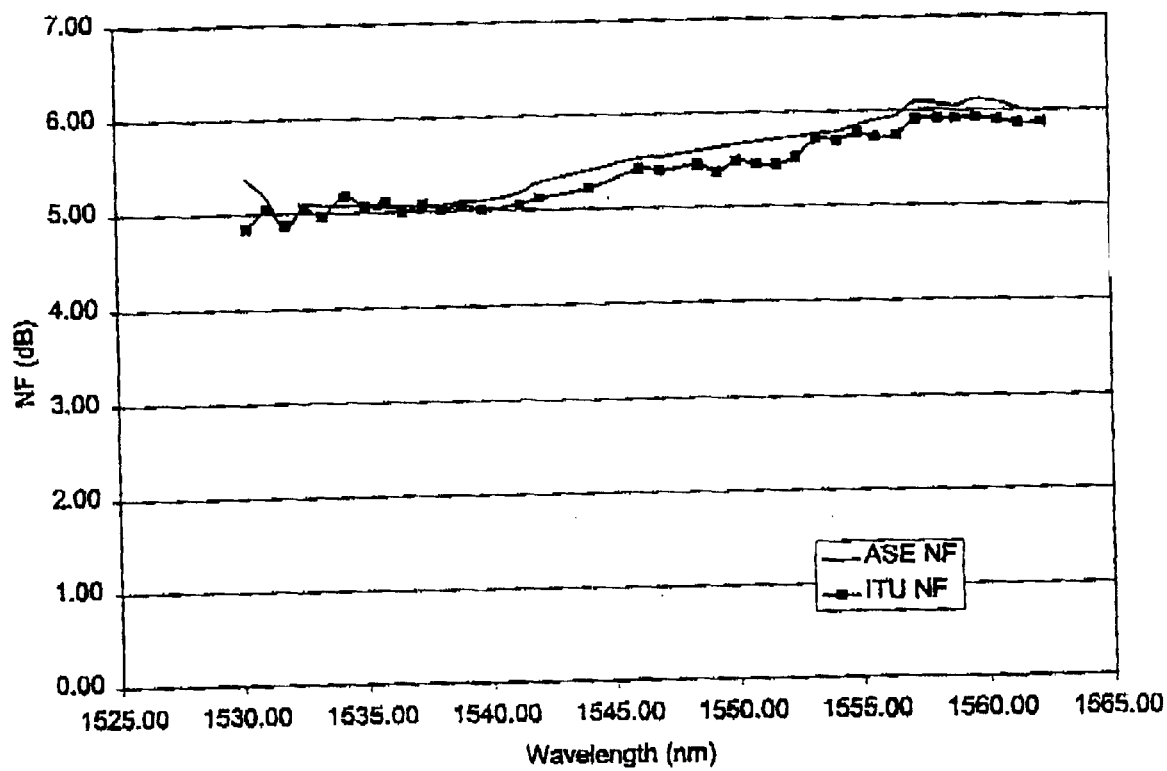
FIG. 6 is a plot comparing a noise figure spectrum obtained using the apparatus of FIG. 2 with the spectrum obtained using a conventional ITU grid source.

The results of such a comparison are shown in FIGS. 5 and 6. Gain and noise figure spectra were measured using both sources 20 and 2. Both figures show remarkably good agreement between the spectrum measured using the ITU grid and the spectrum measured using the ASE source with the worst gain delta being less than 0.4 dB and the worst noise figure delta being less than 0.3 dB. The small differences that do exist can be attributed to experimental errors such as connector loss variation.

In summary, the spectral loading used to test erbium amplifiers needs to closely resemble conditions seen in the field. Use of an ITU grid is a good way of achieving this, however it is a costly solution and may restrict the spectral resolution. Use of a high power amplified spontaneous emission source gives a cost-effective alternative, which compares well with ITU grid measurements. In addition the spectral resolution of the measurement is then only limited by the spectral resolution of the optical spectrum analyser.

What is claimed is:

1. A method of testing an optical amplifier comprising:

coupling a broadband source to the amplifier input, measuring the amplifier performance using an optical spectrum analyzer, wherein the gating occurs at a frequency sufficiently high that the amplifier remains saturated during the off phase of the gating.

2. A method according to claim 1, wherein the output of the amplifier is gated upstream of the optical spectrum analyzer.

3. A method according to claim 2, wherein the source gating and the amplifier output gating is phase-synchronized.

4. A method according to claim 1, wherein the amplifier input is characterised using back-to-back measurement in which the amplifier is bypassed.

5. A method according to claim 1, wherein the broadband source is an ASE source.

6. Apparatus for testing an optical amplifier comprising:

(a) a first terminal couplable to the input terminal of an amplifier under test, (a) a gated broadband source having its output coupled to the first terminal, (c) a second terminal couplable to the output of an amplifier under test, (b) a third terminal coupled to the second terminal and couplable to an optical spectrum analyser;

the source being gated at a frequency sufficiently high that the amplifier remains saturated during the off phase of the gating.

7. Apparatus according to claim 6, wherein the gated source comprises a modulator coupled between the source output and the first terminal.

8. Apparatus according to claim 6, further comprising an attenuator coupled between the gated source output and the first terminal.

9. Apparatus according to claim 6, further comprising a polarization scrambler coupled between the gated source output and the first terminal.

10. Apparatus according to claim 6, further comprising a modulator coupled between the second and third terminals.

11. Apparatus according to claim 6, further comprising an attenuator coupled between the second and third terminals.

12. Apparatus according to claim 6, wherein the broadband source is an ASE source.

* * * * *